United States Patent
Kanai et al.

(10) Patent No.: US 6,975,333 B2
(45) Date of Patent: Dec. 13, 2005

(54) INFORMATION PROCESSING METHOD AND APPARATUS AND MEDIUM

(75) Inventors: Takeshi Kanai, Chiba (JP); Koichi Sugimoto, Saitama (JP)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 09/890,844

(22) PCT Filed: Dec. 5, 2000

(86) PCT No.: PCT/JP00/08610
§ 371 (c)(1),
(2), (4) Date: Jan. 4, 2002

(87) PCT Pub. No.: WO01/42975
PCT Pub. Date: Jun. 14, 2001

(65) Prior Publication Data
US 2003/0151613 A1 Aug. 14, 2003

(30) Foreign Application Priority Data
Dec. 9, 1999 (JP) ......... P11-350864

(51) Int. Cl.⁷ .................. G09G 5/00
(52) U.S. Cl. .................. 345/619
(58) Field of Search .......... 345/17, 467, 468, 345/471, 619, 689, 760, 775, 788, 947, FOR 116, FOR 139, FOR 144–148, FOR 151, 453, FOR 161–164, FOR 192, 210, FOR 201, FOR 142, FOR 153; 382/291, 293; 715/500, 501.1, 502, 505, 513–531, 535–539, 541, 900, 901, 907, 908, 503

(56) References Cited

U.S. PATENT DOCUMENTS 5,813,018 A * 9/1998 Kaji et al. .................. 715/502

OTHER PUBLICATIONS

Thomas Chester and Richard H. Alden, Mastering Excel 97, 1997, Sybex, Foudh Edition, pp. 325, 347–348.*

Thomas Chester and Richard H. Alden, Mastering Excel 97, 1997, Sybex, Fourth Edition, pp. 325, 347–348.*

* cited by examiner

Primary Examiner—Matthew C. Bella
Assistant Examiner—G. F. Cunningham
(74) Attorney, Agent, or Firm—Jay H. Maioli

(57) ABSTRACT

An information processing method and apparatus, wherein drawing information including at least one object that can be displayed, information pertinent to the size in the line direction and in the line feed direction of the object, and layout-related information are analyzed. Coordinate information pertinent to a display start position of the object in a drawing area is acquired based on a result of the analysis, the coordinate information pertinent to the display start position is converted based on the layout-related information acquired by the results of analysis, and the converted coordinate information pertinent to the display start position is converted into real drawing coordinate information on the drawing area.

12 Claims, 21 Drawing Sheets

⟨DOCUMENT LINE START MARGIN = "2em"⟩

⟨TITLE LINE DIRECTION PLACING POSITION = "LINE END"⟩

構造化文書の表示

⟨/TITLE⟩

⟨PARAGRAPH⟩

構造化文書を作成するとき、特に注意すべきことは、レイアウトに依存しないコンテンツを記述することである。

⟨/PARAGRAPH⟩

⟨PARAGRAPH CHARACTER LOWERING WIDTH = "3em"⟩

⟨STYLE EMPHASIS POINT POSITION = "UPSTREAM"⟩難しい⟨/STYLE⟩ことですが。

⟨/PARAGRAPH⟩

.
.
.

⟨/DOCUMENT⟩

FIG.9

INFORMATION PROCESSING METHOD AND APPARATUS AND MEDIUM

TECHNICAL FIELD

This invention relates to an information processing method and apparatus and to a medium used in the method and apparatus. More particularly, it relates to an information processing method and apparatus for processing an object that can be displayed, and to a medium used in the method and apparatus.

BACKGROUND ART

The W3C (World Wide Web Consortium: http://www.w3.org), which is an organization for standardization pertinent to WWW (World Wide Web) technology, provides for the descriptive language for representing structured documents, such as CSSI (Cascading Style Sheets, level 1:http://www.w3.org/TR/REC-CSS1) or CSS2 (http://www.w3.org/TR/REC-CSS2).

Typical of the descriptive languages for structured documents are HTML (HyperText Markup Language), SGML (Standard Generalization Markup Language) and XML (eXtensible Markup Language). Of these, XML features the user being able to define tags as necessary, in distinction from HTML allowing for use only of pre-defined tags.

The above-mentioned customary descriptive languages are all designed on the basis of documents written in horizontal array, and hence may be difficult to use in vertically arrayed texts, such as those written in Japanese or Chinese. For example, if it is desired to represent the vertically arrayed document in "upward-justified" style, a command for "left justification" needs to be used as a command, despite the fact that the conventional descriptive language based on the horizontally arrayed text "upward-justifies" the vertically justified text, thus imposing difficulties in understanding on the user.

There is a layout descriptive command specialized in vertical text arrangement, such as "upward justification" or "downward justification". However, if this command is used, mere attempt to represent the structured document in horizontal text arrangement leads to the necessity for re-writing the totality of the layout-related information.

DISCLOSURE OF THE INVENTION

It is therefore an object of the present invention to provide an information processing method and apparatus and a medium whereby the layout of objects, such as characters, figures, or symbols used in a computer may be readily changed, that is a command text intelligible to the user may be used for both the vertically arrayed text and horizontally arrayed text, and the vertically arrayed text can be easily converted to the horizontally arrayed text and vice versa.

In one aspect, the present invention provides an information processing method including analyzing the drawing information at least including the information of at least one object that can be displayed and the layout designating information for specifying a relative position direction with respect to the direction of arranging the object, determining a relative placing position of the object in a desired drawing area based on the layout definition information corresponding to the layout designating information obtained on analysis of the drawing information and generating the real display position information corresponding to the relative placing position of the object responsive to the arranging direction.

In another aspect, the present invention provides an information processing apparatus including means for analyzing the drawing information at least including the information of at least one object that can be displayed and the layout designating information for specifying a relative position direction with respect to the direction of arranging the object, means for determining a relative placing position of the object in a desired drawing area based on the layout definition information corresponding to the layout designating information obtained on the analysis of the drawing information and means for generating the real display position information corresponding to the relative placing position of the object responsive to the arranging direction.

In still another aspect, the present invention provides an information processing method including generating the information of at least one object that can be displayed, generating the layout designating information specifying the relative position direction with respect to the arranging direction of the object, and generating the drawing information at least including the object information and the layout designating information.

In still another aspect, the present invention provides an information processing apparatus including means for generating the information of at least one object that can be displayed, means for generating the layout designating information specifying the relative position direction with respect to the arranging direction of the object and means for generating the drawing information at least including the object information and the layout designating information.

In still another aspect, the present invention provides a medium for causing an information processing apparatus to execute a program including analyzing the drawing information at least including the information of at least one object that can be displayed and the layout designating information for specifying a relative position direction with respect to the direction of arranging the object, determining a relative placing position of the object in a desired drawing area based on the layout definition information corresponding to the layout designating information obtained on analysis of the drawing information and generating the real display position information corresponding to the relative placing position of the object responsive to the arranging direction.

In still another aspect, the present invention provides an information processing method including analyzing the drawing information at least including the information containing at least one object that can be displayed, the information pertinent to the size of the object in the line direction and in the line feed direction and the information pertinent to the layout, acquiring the coordinate information pertinent to a display start position of the object in a drawing area based on the result of analysis, converting the coordinate information pertinent to the display start position based on the layout-related information obtained by the result of the analysis and converting the coordinate information pertinent to the converted display start position into the real drawing coordinate information on a drawing area.

In still another aspect, the present invention provides an information processing method including capturing in storage means the drawing information at least including the information containing at least one object which has been transmitted and which can be displayed, the information pertinent to the size in the line direction and in the line feed direction of the object and the layout-related information, analyzing the drawing information stored in the storage means and acquiring the coordinate information pertinent to a display start position of the object in a drawing area based on the result of the analysis, converting the coordinate information pertinent to the display start position based on the layout-related information acquired by the results of analysis and demonstrating the object on the display means based on the real drawing coordinate information.

In still another aspect, the present invention provides an information processing apparatus including means for receiving the drawing information at least including the information containing at least one object which has been transmitted and which can be displayed, the information pertinent to the size in the line direction and in the line feed direction of the object and the layout-related information, storage means for storing the drawing information received by the receiving means, signal processing means for analyzing the drawing information read out from the storage means, acquiring the coordinate information pertinent to a display start position of the object in a drawing area based on the result of the analysis, converting the coordinate information pertinent to the display start position based on the layout-related information acquired by the results of analysis and for converting the coordinate information pertinent to the converted display start position into the real drawing coordinate information on the drawing area of the display means and control means for demonstrating the object on the display means based on the real drawing coordinate information from the signal processing means.

In yet another aspect, the present invention provides an information processing apparatus including means for reading out the drawing information from storage means storing the drawing information, the drawing information including at least the information containing at least one object which has been transmitted and which can be displayed, the information pertinent to the size in the line direction and in the line feed direction of the object and the layout-related information, display means for displaying the object, signal processing means for analyzing the drawing information read out from the storage means, acquiring the coordinate information pertinent to a display start position of the object in a drawing area based on the result of the analysis, converting the coordinate information pertinent to the display start position based on the layout-related information acquired by the results of analysis and for converting the coordinate information pertinent to the converted display start position into the real drawing coordinate information on the drawing area of the display means and control means for demonstrating the object on the display means based on the real drawing coordinate information from the signal processing means.

Other objects, features and advantages of the present invention will become apparent from the following description of preferred embodiments thereof and the claims.

BRIEF DESCRIPTION OF THE DRAWINGS

FIGS. 2A and 2B illustrate layout designating commands of alignment representation of aligning the leading end of a sentence in a structured document used in the present invention.

FIGS. 3A and 3B illustrate layout designating commands of alignment representation of aligning the trailing end of a sentence in a structured document used in the present invention.

FIGS. 4A and 4B illustrate layout designating commands of specifying the margin at the leading end of the text in a structured document used in the present invention.

FIGS. 6A and 6B illustrate layout designating commands of specifying a downward character shift in a structured document used in the present invention.

FIGS. 8A to 8C illustrate the layout designating commands in case of performing character decoration in the document.

FIG. 9 shows typical layout designation for a structured document employing a layout statement command used in the present invention.

BEST MODE FOR CARRYING OUT THE INVENTION

Figures 1A, 1B:
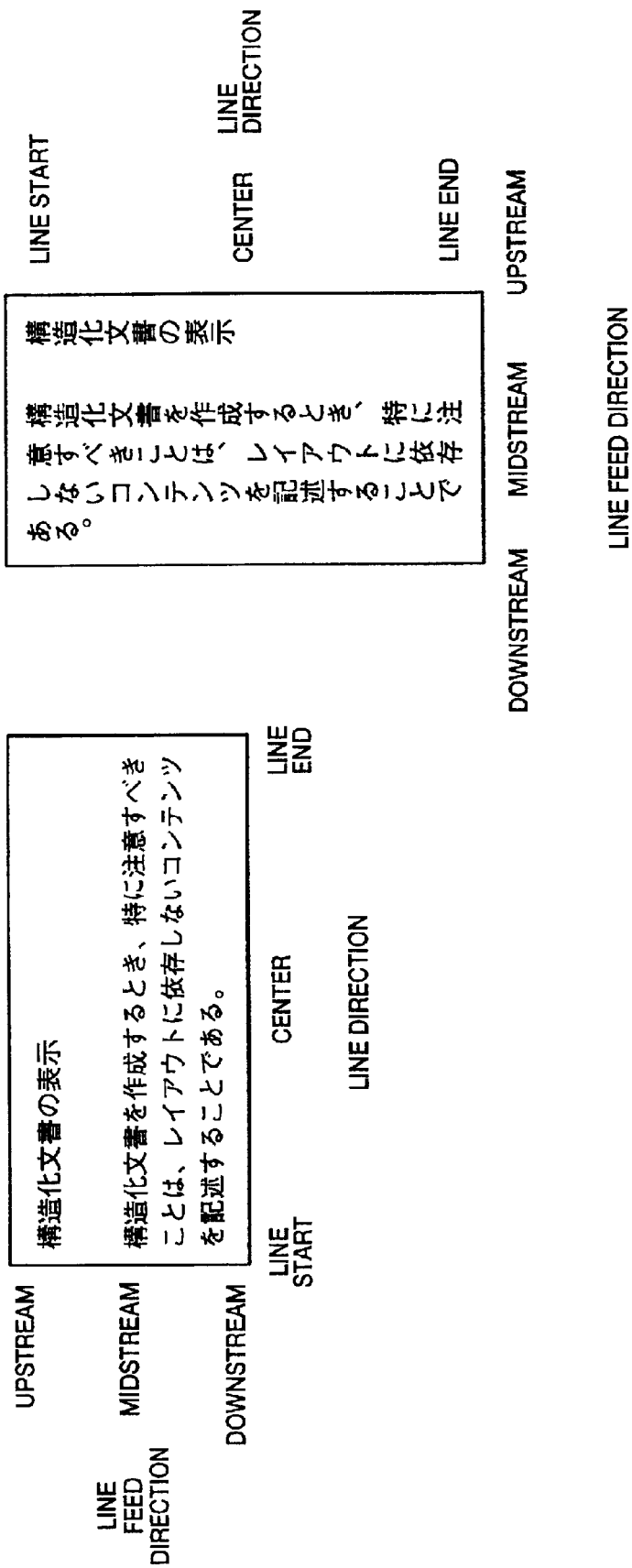
FIGS. 1A and 1B illustrate how relative locations are to be specified in a structured document used in the present invention.

Referring to the drawings, a preferred embodiment of the present invention will be explained in detail.

First, in the present embodiment, position designation pertinent to statement of documents and the direction of representation, such as "leading end of a line", "Trailing end of a line", "upstream" or "downstream", as shown in FIGS. 1A and 1B, are used for a given structured document. FIGS. 1A and 1B respectively show typical representations of structured documents arranged horizontally and vertically. Meanwhile, the layout commands, used in the drawings, state actually used plural commands in an abstract form.

That is, in structured documents by pre-existing descriptive language which is based on the horizontal layout, such as the aforementioned HTML, SGML or XML, invariable position designation by "up", "down", "left" or "right", herein termed absolute position designation, is used, whereas, in horizontally arranged documents in which lines are fed from above to below and characters are fed from left to right, as in English, the left side and the right sides are termed the leading end and the trailing end of a line, respectively. In the present embodiment, the upper or front side of a sentence or character is termed an "upstream" side, the lower side is termed a "downstream" side, by way of relative position designation, the direction of flowing of characters making up a sentence, that is the character proceeding direction, is termed the line direction and the direction of flowing of respective lines, that is the line proceeding direction, is termed the line feed direction, as shown in FIG. 1A. More specifically, in the case of a vertically arranged document in which the lines are fed from right to left and characters are advanced from above towards below, as in Japanese text, upper and lower portions are designated "leading end line" and "trailing end line", respectively, the right and left sides with respect to a given text or character are termed "upstream" side and "downstream" side, respectively, the direction from above to below is termed the line direction and the direction from right to left is termed the line feed direction. It is noted that, in the present embodiment, the direction designating method is basically represented by the relative direction with respect to the sentence or character, as described above, however, it is also possible to designate the absolute direction designation, such as by upper, lower, left or right directions.

Acting on the premises that the position designation is by the aforementioned relative position designation, the relative position designation in case of designating various layout positions for the structured documents shown in FIGS. 1A and 1B is hereinafter explained. The following explanation is directed to "the case of aligning the leading end of a text (aligning representation)", "the case of aligning the trailing end of a text (aligning representation)", "the case of specifying the leading end margin of a text", "the case of specifying the trailing end margin of a text", "the case of specifying the downward shift of a character in a document", "the case of specifying the upward shift of a character in a document" and "the case of decorating a character in a document" are explained as typical of the layout position designation.

The aforementioned layout position designation is merely illustrative, such that the present invention can adapt itself to any suitable layout position designation. However, since it is not realistic to give the totality of possible layout position designations, the aforementioned exemplary layout position designation is given only by way of a representing example.

In the following explanation of the respective layout position designations, layout description commands for pre-existing absolute position designation are also referred to by way of comparison with the layout description commands for relative position designation according to the present invention. However, since the vertically arranged text inherently is not contemplated in the structured document by the preexisting absolute position designation, the vertically arranged document in the structured document by the pre-existing absolute position designation as later explained shows a layout describing command presumably used in the preparation of a vertically arranged document by the pre-existing absolute position designation.

Referring first to FIGS. 2A and 2B, the layout describing command in case of aligning the leading end of a text (aligning representation) is explained. FIGS. 2A and 2B show examples of representation of the vertically arranged structured document and the horizontally arranged structured document.

For example, if, in the horizontally arranged document, shown in FIG. 2A, the leading end of the document is to be aligned, the layout describing command by the relative position designation of the present embodiment is aligning at the leading line end, whereas that by the pre-existing absolute position designation is left alignment. On the other hand, if, in the vertically arranged document, shown in FIG. 2B, the leading end of the document is to be aligned, the layout describing command by the relative position designation of the present embodiment is aligning at the leading line end, whereas that by the pre-existing absolute position designation is left alignment or upward alignment.

That is, if the leading end of a text is to be aligned, the layout describing command by relative position designation of the present embodiment is "alignment at the leading line end" for both the horizontally arranged document and the vertically arranged document, with the layout describing command not being changed. Moreover, the actual layout designating position is intuitively intelligible to a user no matter whether the text is arranged horizontally or vertically. Conversely, the pre-existing layout describing command for absolute position designation is "left aligning" in case of a horizontally arranged text, while being "left aligning" or "upward aligning" in case of a vertically arranged text, so that, if "upward aligning" is used for the vertically arranged text, the layout describing command differs for the vertically arranged text or the horizontally arranged text, such that different layout describing commands need to be used for the vertically arranged text and for the horizontally arranged text. Moreover, if, in the case of the pre-existing layout describing command for absolute position designation, the layout describing command "left aligning" is used for the vertically arranged text even though the command is for designating the leading end of the text, the actual layout designating position is less intelligible on intuition to a user.

If, with the use of FIGS. 3A and 3B, the layout describing command in case of aligning the trailing end of the text (aligning representation) is explained. FIGS. 3A and 3B show typical representation of a horizontally arranged structured document and a vertically arranged structured document, respectively.

If, in the horizontally arranged document, shown in FIG. 3A, the trailing end of the text is to be aligned, the layout describing command for specifying the relative position of the present embodiment is "line end alignment", whereas that for the pre-existing absolute position designation is "rightward aligning. On the other hand, if, in the vertically arranged document, shown in FIG. 3B, the trailing end of the text is to be aligned, the layout describing command for specifying the relative position of the present embodiment is "line end alignment", whereas that for the pre-existing absolute position designation is "rightward aligning" or "downward aligning".

That is, if the trailing end of a text is to be aligned, the layout describing command by relative position designation of the present embodiment is "alignment at the trailing line end" for both the horizontally arranged document and the vertically arranged document, with the layout describing command not being changed. Moreover, the actual layout designating position is intuitively intelligible to a user no matter whether the text is arranged horizontally or vertically. Conversely, the pre-existing layout describing command for absolute position designation is "right aligning" in case of a horizontally arranged text, while being "right aligning" or "downward aligning" in case of a vertically arranged text, so that, if "downward aligning" is used for the vertically arranged text, the layout describing command differs for the vertically arranged text or the horizontally arranged text, such that different layout describing commands need to be used for the vertically arranged text and for the horizontally arranged text. Moreover, if, in the case of the pre-existing layout describing command for absolute position designation, the layout describing command "right aligning" is used for the vertically arranged text even though the command is for designating the trailing end of the text, the actual layout designating position is less intelligible on intuition to a user.

If, with the use of FIGS. 4A and 4B, the layout describing command in case of aligning the leading end of the text is explained. FIGS. 4A and 4B show typical representation of a horizontally arranged structured document and a vertically arranged structured document, respectively.

If, in the horizontally arranged document, shown in FIG. 4A, the leading end of the text is to be aligned, the layout describing command for specifying the relative position of the present embodiment is "line beginning end alignment", whereas that for the pre-existing absolute position designation is "leftward aligning". On the other hand, if, in the vertically arranged document, shown in FIG. 4B, the leading end of the text is to be aligned, the layout describing command for specifying the relative position of the present embodiment is "line beginning end alignment", whereas that for the pre-existing absolute position designation is "rightward aligning" or "downward aligning".

That is, if the leading end of a text is to be aligned, the layout describing command by relative position designation of the present embodiment is "alignment at the leading line end" for both the horizontally arranged document and the vertically arranged document, with the layout describing command not being changed. Moreover, the actual layout designating position is intuitively intelligible to a user no matter whether the text is arranged horizontally or vertically. Conversely, the pre-existing layout describing command for absolute position designation is "left aligning" in case of a horizontally arranged text, while being "left aligning" or "upward aligning" in case of a vertically arranged text, so that, if "upward aligning" is used for the vertically arranged text, the layout describing command differs for the vertically arranged text or the horizontally arranged text, such that different layout describing commands need to be used for the vertically arranged text and for the horizontally arranged text. Moreover, if, in the case of the pre-existing layout describing command for absolute position designation, the layout describing command "left aligning" is used for the vertically arranged text even though the command is for designating the leading end of the text, the actual layout designating position is less intelligible on intuition to a user.

Figure 5B:
FIGS. 5A and 5B illustrate layout designating commands of specifying the margin at the trailing end of the text in a structured document used in the present invention.
Figure 5A:

If, with the use of FIGS. 5A and 5B, the layout describing command in case of specifying the trailing end of the text is explained. FIGS. 5A and 5B show typical representation of a horizontally arranged structured document and a vertically arranged structured document, respectively.

If, in the horizontally arranged document, shown in FIG. 5A, the trailing end of the text is to be aligned, the layout describing command for specifying the relative position of the present embodiment is "line trailing end alignment", whereas that for the pre-existing absolute position designation is "rightward aligning". On the other hand, if, in the vertically arranged document, shown in FIG. 5B, the trailing end of the text is to be aligned, the layout describing command for specifying the relative position of the present embodiment is "line trailing end alignment", whereas that for the pre-existing absolute position designation is "rightward aligning" or "downward aligning".

That is, if the margin at the trailing end of a text is to be specified, the layout describing command by relative position designation of the present embodiment is "margin at the trailing line end" for both the horizontally arranged document and the vertically arranged document, with the layout describing command not being changed. Moreover, the actual layout designating position is intuitively intelligible to a user no matter whether the text is arranged horizontally or vertically. Conversely, the pre-existing layout describing command for absolute position designation is "right margin" in case of a horizontally arranged text, while being "right margin" or "downward margin" in case of a vertically arranged text, so that, if "downward margin" is used for the vertically arranged text, the layout describing command differs for the vertically arranged text or the horizontally arranged text, such that different layout describing commands need to be used for the vertically arranged text and for the horizontally arranged text. Moreover, if, in the case of the pre-existing layout describing command for absolute position designation, the layout describing command "right margin" is used for the vertically arranged text even though the command is for designating the margin at the trailing end of the text, the actual layout designating position is less intelligible on intuition to a user.

If, with the use of FIGS. 6A and 6B, the layout describing command in case of specifying downward character shift in a text is explained. FIGS. 6A and 6B show typical representation of a horizontally arranged structured document and a vertically arranged structured document, respectively.

If, in the horizontally arranged document, shown in FIG. 6A, the downward character shift is to be specified, the layout describing command for specifying the relative position of the present embodiment is "downward character shift width", whereas that for the pre-existing absolute position designation specifies a command corresponding to the sum of the upward margin and the downward character shift width as being "left margin". On the other hand, if, in the vertically arranged document, shown in FIG. 6B, the downward shift of a character is to be specified, the layout describing command for specifying the relative position of the present embodiment is the "downward character shift", whereas the layout describing command of the pre-existing absolute position designation specifies a command corresponding to the sum of the upward margin and the downward character shift width as being "left margin", or specifies a command corresponding to the sum of the upward margin and the downward character shift width as being "upper margin".

That is, if the downward character shift is to be specified, the layout describing command by relative position designation of the present embodiment is "downward character shift width" for both the horizontally arranged document and the vertically arranged document, with the layout describing command not being changed. Moreover, the actual layout designating position is intuitively intelligible to a user no matter whether the text is arranged horizontally or vertically. Conversely, the pre-existing layout describing command for absolute position designation specifies a command corresponding to the sum of the left margin and the downward character shift width in case of a horizontally arranged text as being the "left margin" or the "upper margin", so that, if "upward margin" is used for the vertically arranged text, the layout describing command differs for the vertically arranged text or the horizontally arranged text, such that different layout describing commands need to be used for the vertically arranged text and for the horizontally arranged text. Moreover, if, in the case of the pre-existing layout describing command for absolute position designation, the layout describing command in which the command corresponding to the sum of the left margin and the downward character shift width is the "left margin" is used in the vertically arranged text, the actual layout designating position is less intelligible on intuition to a user.

Figure 7B:
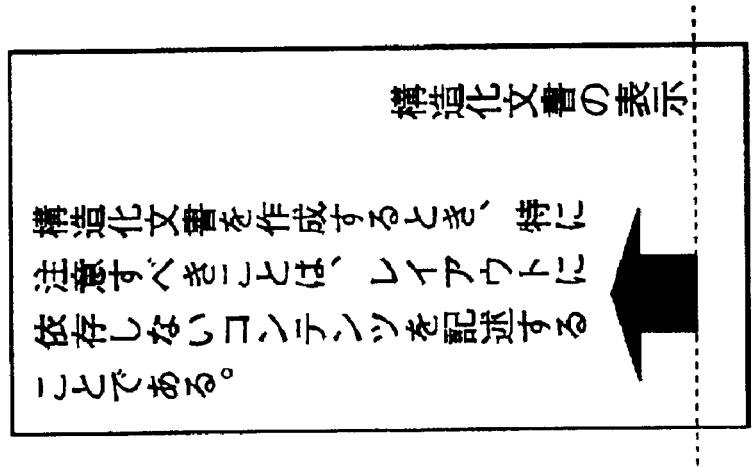
FIGS. 7A and 7B illustrate layout designating commands of specifying an upward character shift in a structured document used in the present invention.
Figure 7A:
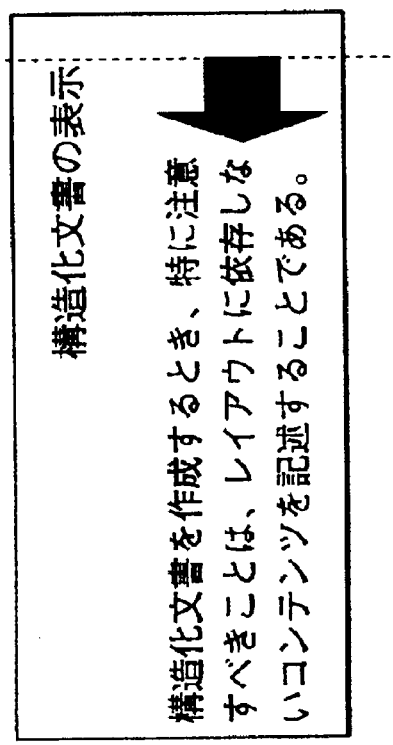

Referring to FIGS. 7A and 7B, the layout describing command in case of specifying the an arbitrary upward shift of an arbitrary character in a document is explained. FIGS. 7A and 7B show typical representation of a horizontally arranged structured document and typical representation of a vertically arranged structured document.

If, in the horizontally arranged document, shown in FIG. 7A, the upward character shift is to be specified, the layout describing command for specifying the relative position of the present embodiment is "upward character shift width", whereas that for the pre-existing absolute position designation specifies a command corresponding to the sum of the leftward margin and the downward character shift width as being "right margin". On the other hand, if, in the vertically arranged document, shown in FIG. 7B, the upward shift of a character is to be specified, the layout describing command for specifying the relative position of the present embodiment is "upward character shift width", whereas the layout describing command of the pre-existing absolute position designation specifies a command corresponding to the sum of the upward margin and the upward character shift width as being "right margin", or specifies a command corresponding to the sum of the rightward margin and the upward character shift width as being "lower margin".

That is, if the upward character shift is to be specified, the layout describing command by relative position designation of the present embodiment is "upward character shift width" for both the horizontally arranged document and the vertically arranged document, with the layout describing command not being changed. Moreover, the actual layout designating position is intuitively intelligible to a user no matter whether the text is arranged horizontally or vertically. Conversely, the pre-existing layout describing command for absolute position designation specifies a command corresponding to the sum of the right margin and the upward character shift width as being the "right margin" or the "lower margin", so that, if the command corresponding to the sum of the right margin and the upward character shift width is "lower margin" is used for the vertically arranged text, the layout describing command differs for the vertically arranged text or the horizontally arranged text, such that different layout describing commands need to be used for the vertically arranged text and for the horizontally arranged text. Moreover, if, in the case of the pre-existing layout describing command for absolute position designation, the layout describing command "right margin" is used in the vertically arranged text, the actual layout designating position is less intelligible on intuition to a user.

Referring to FIGS. 8A to 8C, the layout describing command for decorating characters in a document is explained. FIGS. 8A to 8C show an exemplary horizontally arranged text, an exemplary vertically arranged text and an exemplary text comprised of a mixture of the vertically and horizontally arranged texts. In these figures, emphasis points are appended to the characters as being typical decoration for characters.

Since the character decoration of affixing emphasis points to characters is not possible with the pre-existing layout describing command for specifying the absolute position, only the layout describing command for the present embodiment is here explained.

If, in the horizontally arranged text, shown in FIG. 8A, emphasis points are to be appended to the characters, the layout describing command for specifying the relative position of the present embodiment is [<STYLE emphasis point position="*">], where * denotes an arbitrary character string. On the other hand, if, in the vertically arranged text, shown in FIG. 8A, emphasis points are to be appended to the characters, the layout describing command for specifying the relative position of the present embodiment is [<STYLE emphasis point position="*">], where * denotes the emphasis point position. Similarly, if emphasis points are to be appended to the characters in a text where vertically arranged sentences co-exist with the horizontally arranged sentence, as shown in FIG. 8C, the layout describing command for specifying the relative position of the present embodiment is [<STYLE emphasis point position="*">].

If the emphasis points are to be appended upstream of the characters, as in FIGS. 8A to 8C, that effect is indicated by [<STYLE emphasis point position="upstream">].

That is, in the present embodiment, the layout describing command for specifying the relative position in case of appending emphasis points to the characters as decoration for characters is [<STYLE emphasis point position="*">], for both the vertically arranged text and for the horizontally arranged text, with the layout describing command not being changed. Moreover, the actual layout designating position is intelligible on intuition to a user for both the vertically arranged text and for the horizontally arranged text.

Figure 10:
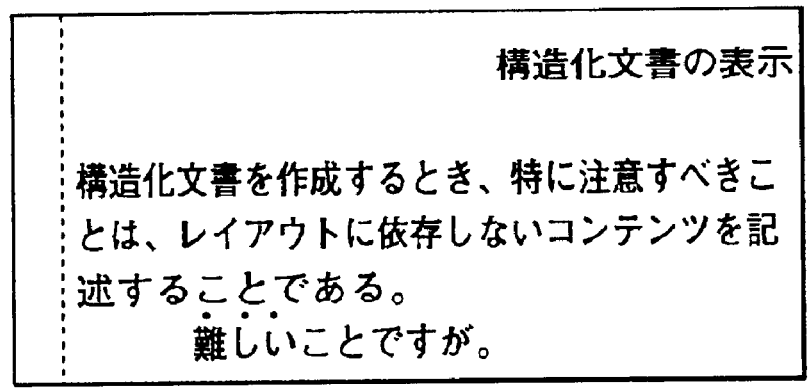
FIG. 10 shows typical document representation incase the layout-specified structured document shown in FIG. 9 is represented as a horizontally arranged document.
Figure 11:
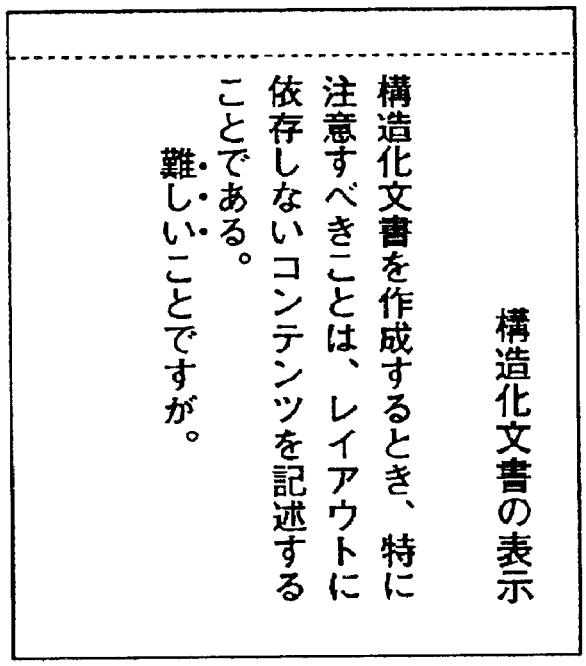
FIG. 11 shows typical document representation in case the layout-specified structured document shown in FIG. 9 is represented as a vertically arranged document.

FIG. 9 shows typical layout designation of a structured document employing the layout describing command of the present embodiment. FIGS. 10 and 11 show exemplary document display in case the structured document layout-specified as shown in FIG. 9 is actually displayed e.g., on a computer display. Specifically, FIGS. 10 and 11 show exemplary display of the structured document, layout-specified as shown in FIG. 9 and which has been arranged as a horizontally arranged text, and exemplary display of the structured document, layout-specified as shown in FIG. 9 and which has been arranged as a vertically arranged text, respectively. In the present embodiment, the structured document shown in FIG. 9 is described using XML featuring the user being able to define a tag as necessary on his or her own.

In FIG. 9, [<document, line beginning end margin="2em">] specifies providing a line beginning end margin by 2em, that is two full-size characters, and constitutes one structured document from the [<document line beginning end margin="2em">] to the last "</document>".

The [<title, line direction placing position="line end">] through [構造化文書の表示 (display of structured document)] to [</title>] specifies the placing position for the title text. In the present embodiment, the placing position is specified by matching the placing position in the line direction of the title text [構造化文書の表示 (display of structured document)].

The document is placed from the [<paragraph>] to the first [</paragraph>]. In the present embodiment, [構造化文書を作成するとき、特に注意すべきことは、レイアウトに依存しないコンテンツを記述することである。(what is particularly important in creating the structured document is to state contents not dependent on the layout)].

From [<paragraph character lowering width="3em">] through [<STYLE emphasis point position="upstream"> 難しい (difficult.) </STYLE> ことですが。(It is, however, . . .)] to the next [</paragraph>], it is specified that the text [難しいことですが (It is, however, difficult.)] is character-shifted by 3em, that is by three full-size characters, and that emphasis points be affixed upstream of respective characters [難しい (difficult)]. In the present embodiment, the text [難しいことですが (It is, however, difficult.)] is character-shifted further by three full-size characters from the line beginning end, specified previously.

If the layout-specified structured document is displayed as horizontal arrangement, as in FIG. 9, the representation is as shown in FIG. 10. If the layout-specified structured document is displayed as vertical arrangement, as in FIG. 9, the representation is as shown in FIG. 11. More specifically, when the structured document, layout-specified as shown in FIG. 9, is represented as a horizontally arranged document, the line beginning margin of full two character size is set and the title reading [構造化文書の表示 (display of structured document)] is placed at the line end, as shown in FIG. 10. The text reading [構造化文書を作成するとき、. . . (what is particularly important in creating the structured document is . . . )] is placed downstream of the title text. The text reading [難しいことですが。(It is, however, difficult.)] is placed receded by three full-size characters from the line beginning end margin, with emphasis points being added upstream of respective characters of [難しい (difficult)]. Similarly, when the structured document, layout-specified as shown in FIG. 9, is represented as a vertically arranged document, the line beginning margin of full two character size is set and the title reading [構造化文書の表示 (display of structured document] is placed at the line end. The text reading [構造化文書を作成するとき、. . . (what is particularly important in creating the structured document is . . . )] is placed downstream of the title text. The text reading [難しいことですが。(It is, however, difficult.)] is placed receded by three full-size characters from the line beginning end margin, with emphasis points being added upstream of respective characters of [難しい (difficult)]. Thus, with the present embodiment, the layout-specified structured document shown in FIG. 9 is able to cope with both the vertically arranged text and the horizontally arranged text, and is also intelligible to the user.

Referring to FIGS. 12 to 20, the processing flow in demonstrating the structured document of FIG. 9 in a display in an actual drawing apparatus as the information processing apparatus is explained.

Figure 12:
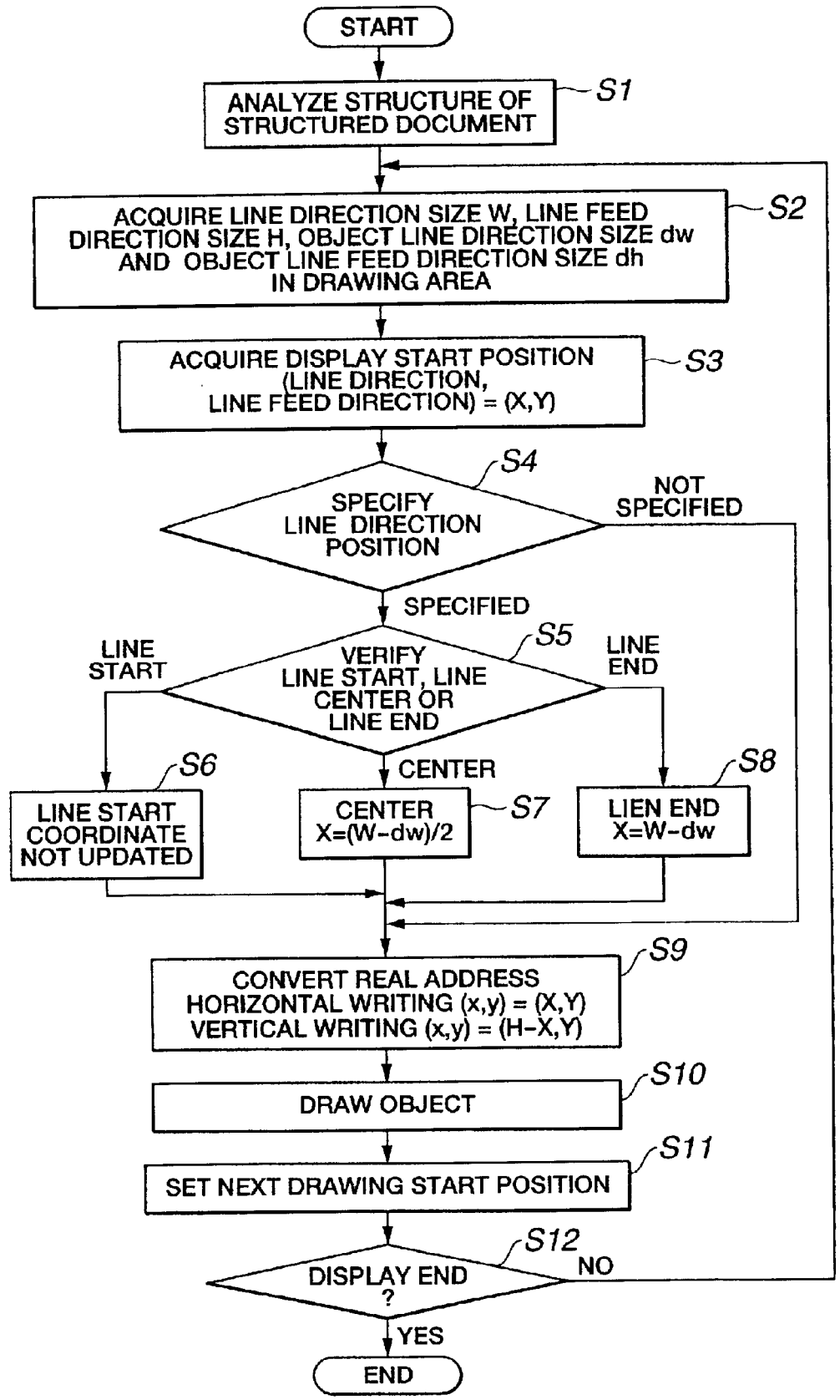
FIG. 12 is a flowchart showing the processing flow in determining a "position in the line direction" of an object drawn by a drawing apparatus according to the present invention.

FIG. 12 shows the processing flow in determining the [line direction placing position] of an object, such as sentence, symbol of figure, drawn by the drawing apparatus of the present invention, in accordance with the structured document of FIG. 9.

In FIG. 12, the drawing apparatus executes structural analysis of the structured document by way of the processing st step S1.

At step S1, the drawing apparatus performs structural analysis in case of determining the [line direction placing position]. The drawing apparatus analyzes the line direction size W and the line feed direction size H of the drawing area, as shown in FIGS. 13A and 13B, while acquiring the line direction size dw and the line feed direction size dh of the object to be drawn, as shown in FIG. 14.

Figure 13A:
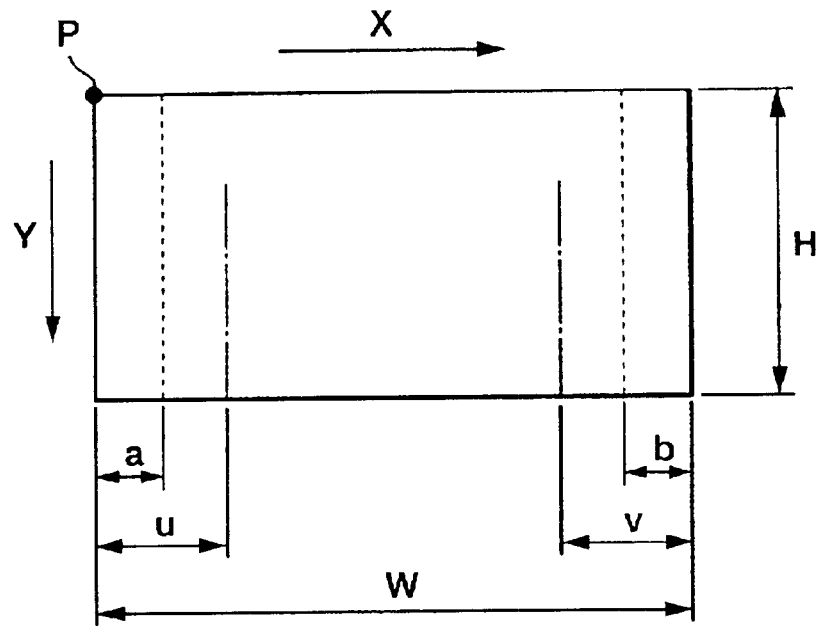
FIGS. 13A and 13B illustrate the size in the line direction and in the line feed direction of a drawing area, margin width in the leading and trailing ends of a line, upward character shift worth and downward character shift width.
Figure 13B:
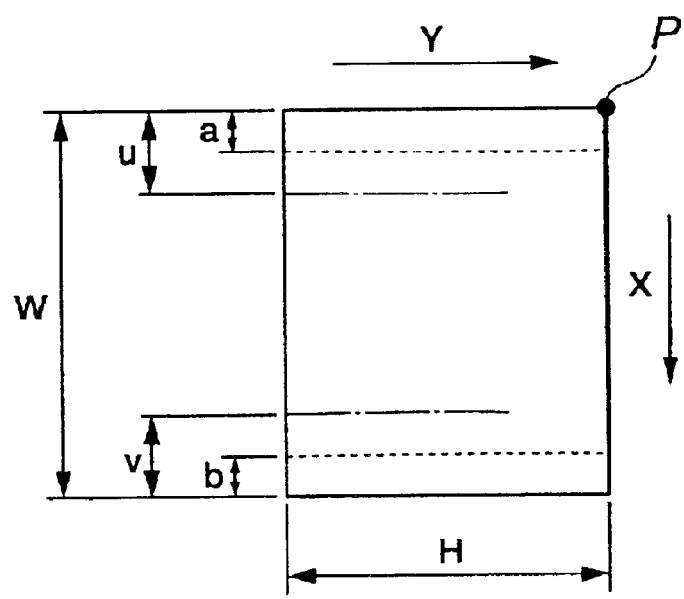
Figure 14:
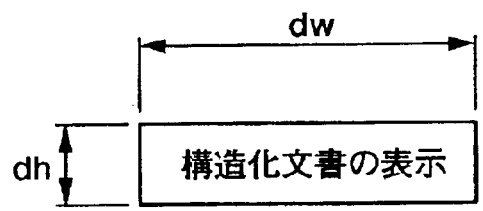
FIG. 14 illustrates the size in the line direction and in the line feed direction.

Meanwhile, FIG. 13A shows the drawing area in case of the horizontally arranged document, FIG. 13B shows the drawing area in case of the vertically arranged document and FIG. 14 shows an object. In the drawing area of the horizontally arranged document, shown in FIG. 13A, the arrow directions X and Y denote the line direction and the line feed direction, respectively, while the size W and the size H denote the size in the line direction and the size in the line feed direction, respectively. In the drawing area of the vertically arranged document, shown in FIG. 13B, the arrow directions X and Y denote the line direction and the line feed direction, respectively, while the size W and the size H denote the size in the line direction and the size in the line feed direction, respectively. Points P in FIGS. 13A and 13B denote points of origin of the drawing area. In the object being processed, shown in FIG. 14, the size dw and the size dh denote the size in the line direction and the size in the line feed direction, respectively.

When the drawing apparatus acquires the information of the respective sizes at step S2, it acquires at the next step S3 the coordinate values from the point of origin P ((line direction and line feed direction)=(X,Y)) as a display starting position of the object being drawn.

The drawing apparatus then verifies, as processing at step S4, whether or not the line direction placing position of the object being processed has been specified, based on the result of analysis of the structured document. If it has been determined that the line direction placing position has been specified, the drawing apparatus proceeds to the processing at step S5 and, if otherwise, it proceeds to the processing at step S9.

At step S5, the drawing apparatus verifies whether the line direction placing position of the object being processed specified is at the line beginning end, line mid position or at the line trailing end. If the drawing apparatus has verified that the line direction placing position specified is at the line beginning end, it proceeds to processing at step S6. If the drawing apparatus has verified that the line direction placing position specified is at the line mid position, it proceeds to processing at step S7 and, if the drawing apparatus has verified that the line direction placing position specified is at the line end position, it proceeds to processing at step S8.

If the drawing apparatus has verified at step S5 that the line direction placing position specified is the line beginning end, it proceeds to processing at step S9, without updating the X-coordinate value at step S6.

If the drawing apparatus has verified at step S5 that the line direction placing position specified is at the line mid position, and proceeds to processing at step S7, the drawing apparatus calculates X=(W−dw)/2 and updates the calculated result as an X-coordinate value of the display start position of the object in process. The drawing apparatus then proceeds to processing at step S9.

If it is determined at step S5 that the line direction placing position specified is at the line end and thus proceeds to step S8, the drawing apparatus calculates X=W−dw and updates the calculated result as an X-coordinate value of the display start position of the object in process. The drawing apparatus then proceeds to processing at step S9.

At step S9, the drawing apparatus converts the coordinate values (X, Y) of the display start position of the object being processed into a real address (real address value (x, y)) on a display window on the display. That is, if the display window on the display has a range such as one of a window 100 shown in FIG. 15, the drawing apparatus converts the coordinate value (X, Y) of the display start position of the object in process into actual coordinate values (x, y) in a real possible display area 101 in the window 100 indicated by dotted line in FIG. 15. If the object being processed is written horizontally, the drawing apparatus sets the coordinate values (X, Y) into real coordinate values (x, y), whereas, if the object being processed is written vertically, it converts the coordinate values (H−X, Y) int real coordinate values (x, y).

As the processing at step S10, the drawing apparatus draws a picture of the object.

The drawing apparatus then sets the next drawing start position, as processing at step S11. The drawing apparatus then verifies, as processing at step S12, whether or not the entire display has been finished. If it finds that the display has not been finished, it reverts to the processing at step S2 and, if it finds that the display has been finished, the processing comes to a close.

Figure 16:
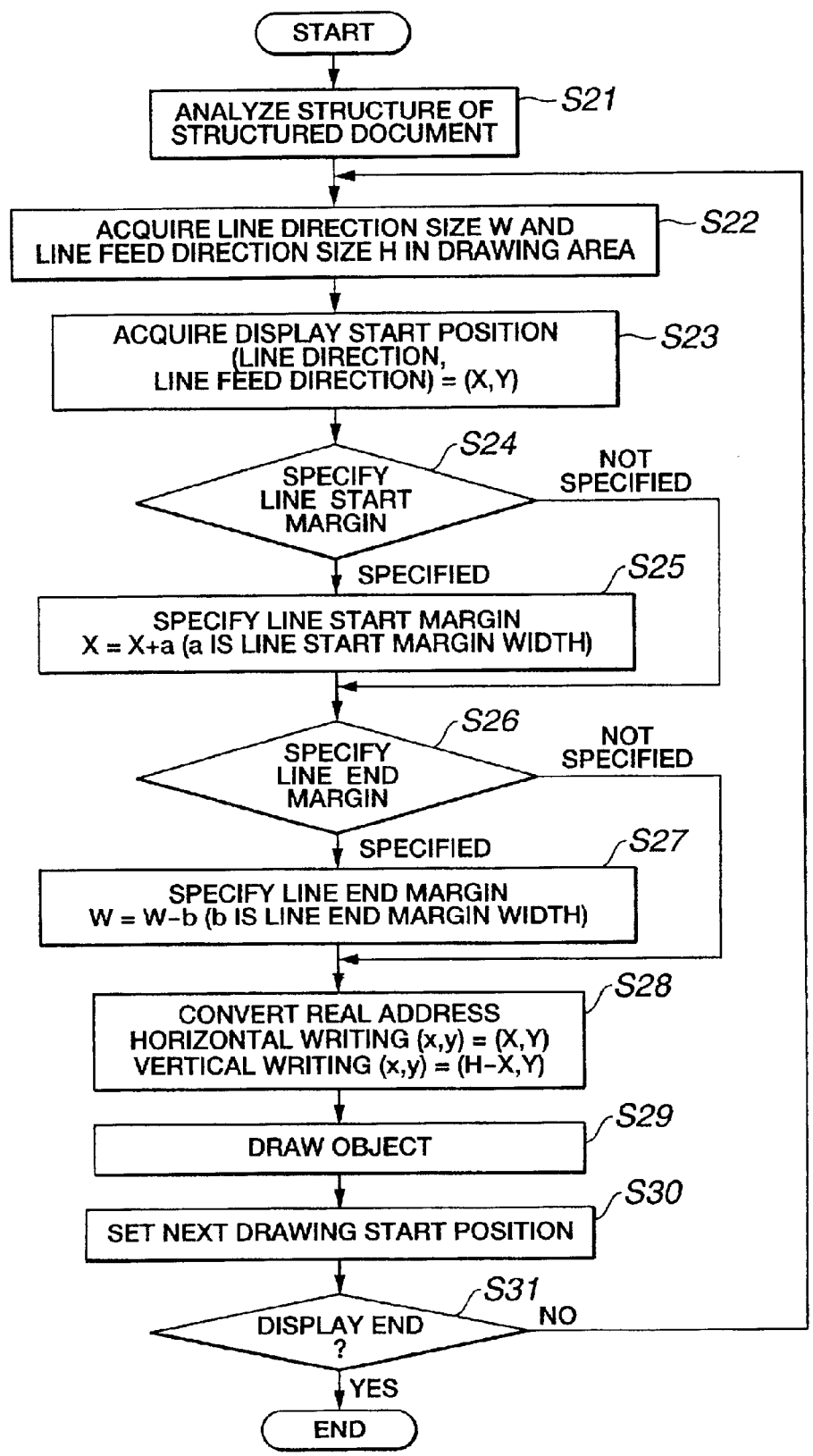
FIG. 16 is a flowchart showing the processing flow in case a preferred embodiment of the drawing apparatus performs "margin designation" for the structured document shown in FIG. 9.

FIG. 16 shows the processing flow when the drawing apparatus of the present embodiment specifies the margin, based on the structured document shown in FIG. 9.

In FIG. 16, the drawing apparatus first analyzes the structure of the structured document, as a processing at step S21.

By structural analysis in case of [specifying the margin], the drawing apparatus acquires the size in the line direction W and the size in the line feed direction H of the drawing area shown in FIG. 13.

When the drawing apparatus acquires the information on the respective sizes at step S22, it acquires the coordinate value from the point of origin P ((line direction, line feed direction)=(X,Y)) as a display start position of the object in process at the processing at the next step S23.

The drawing apparatus then verifies, at the processing at step S24, whether or not the line beginning end margin has been specified based on the result of analysis of the structured document. If the drawing apparatus has verified that the line beginning end margin has been specified, it proceeds to processing at step S25 and, if otherwise, to step S26.

At the processing at step S25, the drawing apparatus calculates X=X+a, where a is the width of the line beginning end margin shown in FIG. 13, and updates the calculated result as an X-coordinate value of the display start position, inclusive of the line beginning end margin width of the object being processed as the document. The drawing apparatus then proceeds to processing at step S26.

The drawing apparatus verifies whether or not the line end margin has been specified as processing at step S26. If the drawing apparatus has verified that the line end margin has not been specified, it proceeds to processing at step S27 and, if otherwise, it proceeds to processing at step S28.

At step S27, the drawing apparatus calculates W=W−b, where b is the width of the line end margin shown in FIG. 13. The drawing apparatus then updates the results of calculation as being the size in the line direction of the drawing area. The processing apparatus then proceeds to processing at step S28.

Figure 15:
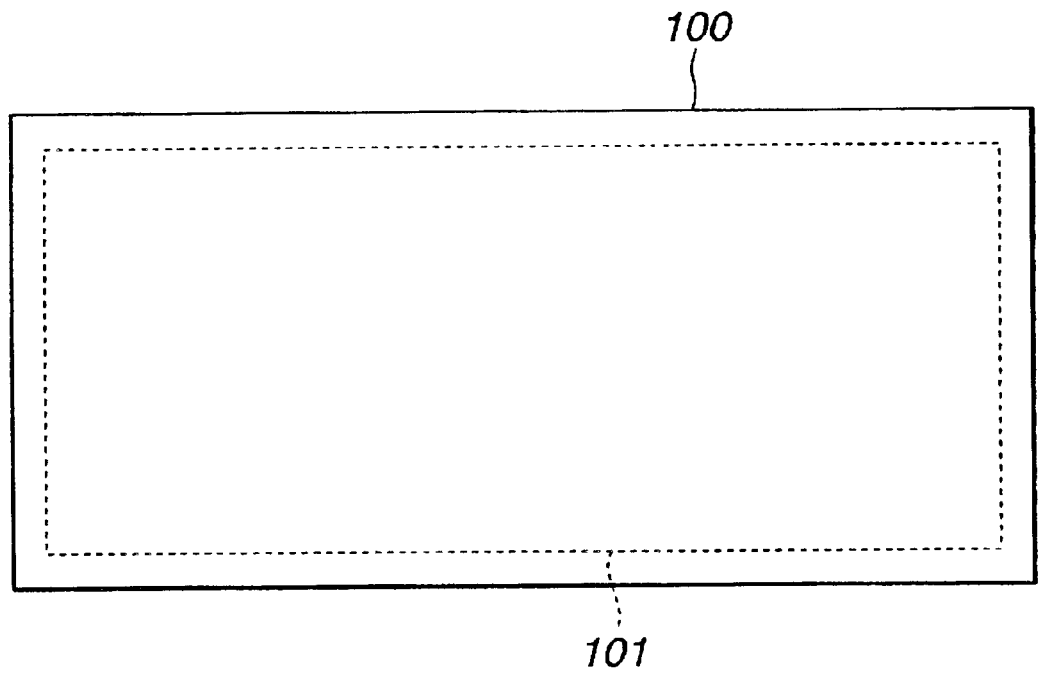
FIG. 15 illustrates the real addresses on the actual display window.

At step S28, the drawing apparatus converts the coordinate value (X, Y) of the display start position of the object being processed as the document into real addresses (real address values (x,y)) on the display window 100 on the display shown in FIG. 15. That is, the drawing apparatus converts the coordinate values (X, Y) of the display start position of the object being processed as the document into real coordinate values (x, y) in the real possible display range 101 in the display window 100. Meanwhile, if the object being processed as the document is arranged horizontally, the drawing apparatus renders the coordinate values (X, Y) into real coordinate values (x, y) and, if the object being processed as the document is arranged vertically, the drawing apparatus renders the coordinate values (H−X, Y) into real coordinate values (x, y).

The drawing apparatus draws each object being processed in the document, by way of processing at step S29. For example, drawing or demonstration is made on the display, as shown in FIGS. 4A, 4B, 5A or 5B, by the processing at step S29.

The drawing apparatus then sets the next drawing start position, as processing at step S30, and verifies, as processing at step S31, whether or not the entire display has been finished. If the drawing apparatus verifies that the display has not been finished, it reverts to processing at step S22 and, if otherwise, the processing is terminated.

Figure 17:
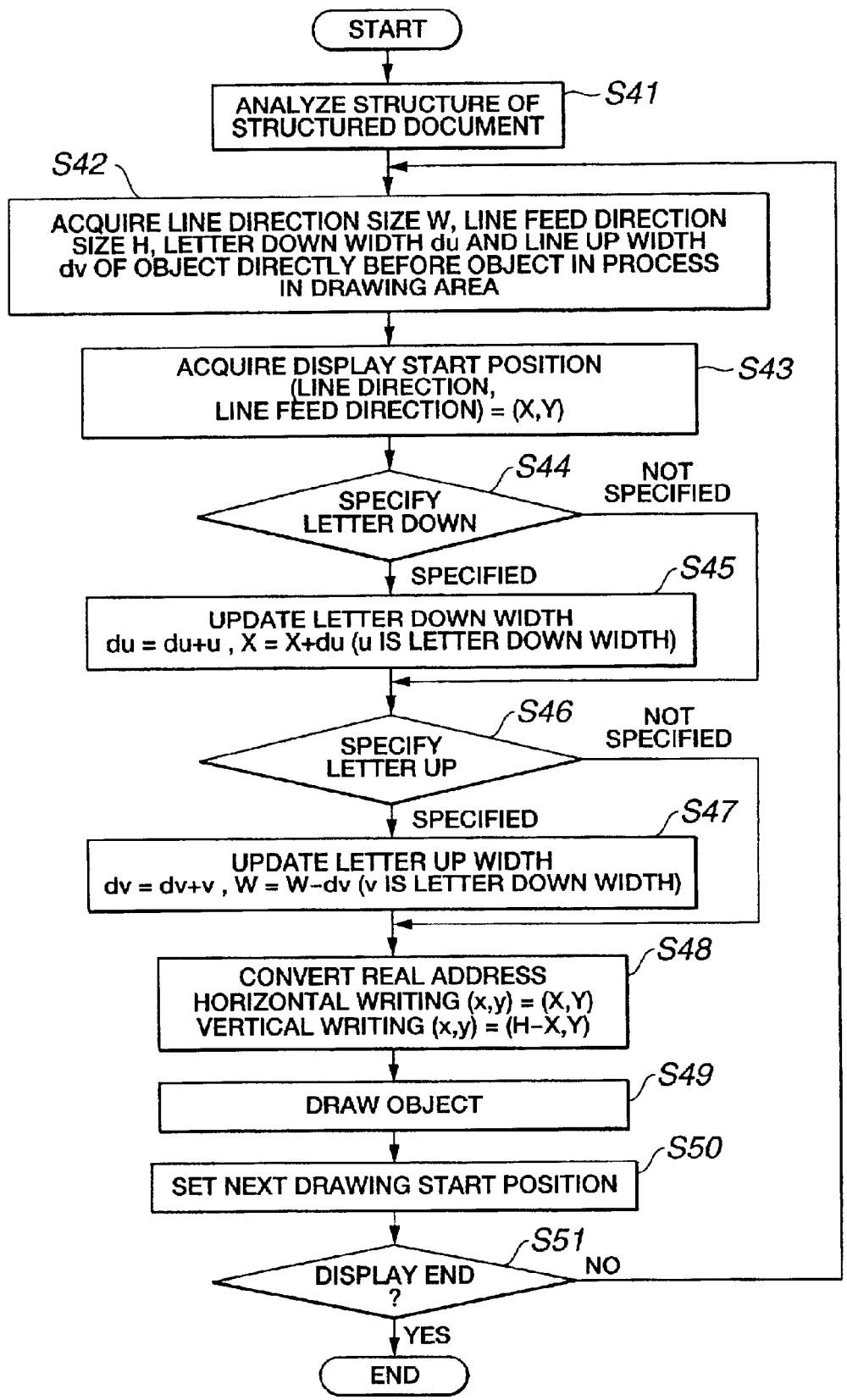
FIG. 17 is a flowchart showing the processing flow in case the present embodiment of the drawing apparatus performs "downward character shifting" and "upward character shifting".

FIG. 17 shows the processing flow in case the drawing apparatus of the present embodiment performs [shifting a character down] or [shifting a character up] in the structured document shown in FIG. 9.

In FIG. 17, the drawing apparatus analyzes the structure of the structured document as processing at step S41.

By the structural analysis in case of performing the [shifting a character down] or [shifting a character up], the drawing apparatus at step S42 acquires the size in the line direction W and the size in the line feed direction H of the drawing area, the character shift-down width du or the character shift up width dv of an object directly ahead of the object being processed shown in FIG. 13. If the line beginning end margin is specified, the downward character shifting width du shown in FIG. 13 is the character shift-down width from the specified line beginning end margin position, whereas, if the line trailing end margin is specified, the upward character shifting width dv shown in FIG. 13 is the character shift-down width from the specified line trailing end margin position.

When the drawing apparatus at step S42 has acquired the information on the above respective sizes and the widths, it acquires at the next step S43 the coordinate values from the point of origin P ((line direction and line feed direction)=(X, Y)), as the display start position of the object being processed.

The drawing apparatus then verifies, at step S44, whether or not the character shift-down has been designated for the object being processed based on the results of analysis of the structured document. If the drawing apparatus has found that the character shift-down has been designated, it proceeds to processing at step S45 and, if otherwise, it proceeds to processing at step S46.

At step S45, the drawing apparatus calculates du=du+u, where u is a new character shift-down width, and X=X+du, and updates the result of calculation as an X-coordinate value of the display start position including the character shift-down width of the object being processed. The drawing apparatus then proceeds to processing at step S46.

The drawing apparatus then verifies, at step S46, whether or not the character shift-up has been designated for the object being processed based on the results of analysis of the structured document. If the drawing apparatus has found that the character shift-up has been designated, it proceeds to processing at step S47 and, if otherwise, it proceeds to processing at step S48.

At step S47, the drawing apparatus calculates dv=dv+v, where v is a new character shift-up width, and X=X+dv, and updates the result of calculation as an X-coordinate value of the display start position including the character shift-up width of the object being processed. The drawing apparatus then proceeds to processing at step S48.

At step S48, the drawing apparatus converts the coordinate value (X, Y) of the display start position of the object being processed as the document into real addresses (real address values (x,y)) on the display window 100 on the display shown in FIG. 15. That is, the drawing apparatus converts the coordinate values (X, Y) of the display start position of the object being processed as the document into real coordinate values (x, y) in the real possible display range 101 in the display window 100. Meanwhile, if the object being processed as the document is arranged horizontally, the drawing apparatus renders the coordinate values (X, Y) into real coordinate values (x, y) and, if the object being processed as the document is arranged vertically, the drawing apparatus renders the coordinate values (H–X, Y) into real coordinate values (x, y).

The drawing apparatus draws each object being processed in the document, by way of processing at step S29. For example, drawing or demonstration is made on the display, as shown in FIG. 4A, 4B, 5A or 5B, by the processing at step S29.

The drawing apparatus then sets the next drawing start position, as processing at step S40, and verifies, as processing at step S41, whether or not the entire display has been finished. If the drawing apparatus verifies that the display has not been finished, it reverts to processing at step S42 and, if otherwise, the processing is terminated.

Figure 18:
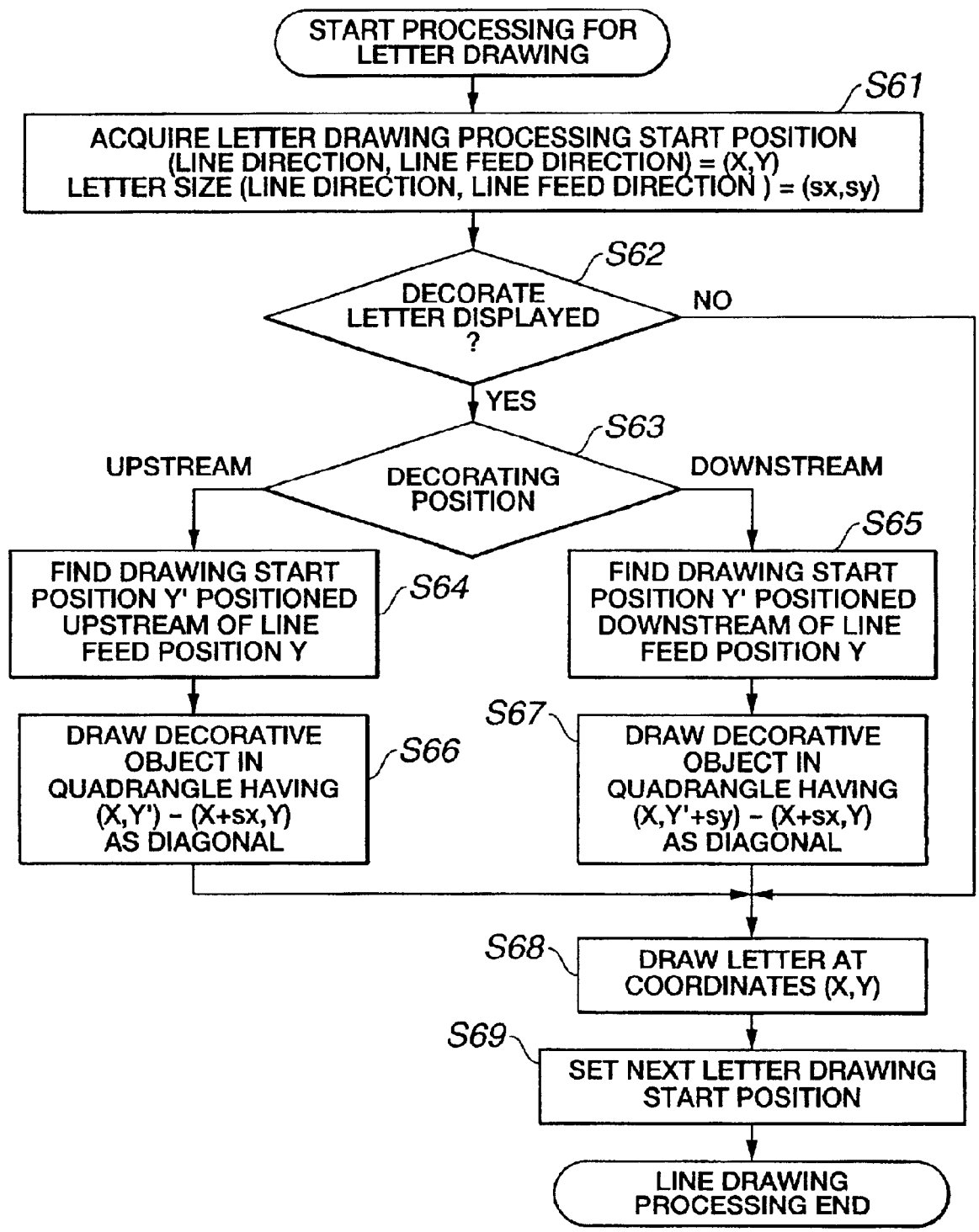
FIG. 18 shows a flowchart showing the processing flow in case a preferred embodiment of a drawing apparatus draws a character and decorates the character as necessary based on the structured document shown in FIG. 9.

FIG. 18 shows the flow of processing in case the drawing apparatus of the present embodiment draws a character in the structured document shown in FIG. 9 and decorates the character as necessary, such as addition of decorative objects, e.g., an emphasis line. The processing of FIG. 18 is includes e.g., in each processing step of the processing for drawing an object being processed in each flowchart shown in FIG. 17.

In FIG. 18, the drawing apparatus acquires, from the results of the structural analysis, previously performed, the coordinate values of the character drawing start position ((line direction, line feed direction)=(X, Y)) and character sizes ((line direction, line feed direction)=(sx, sy)).

Figure 19A:
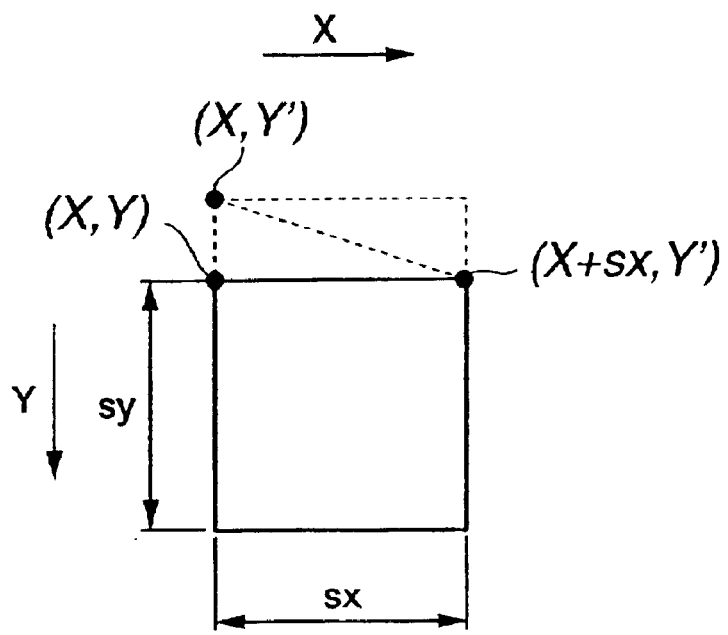
FIGS. 19A and 19B illustrate a drawing area for one character and a drawing position of a decorative object in case of a horizontally arrayed text.
Figure 19B:
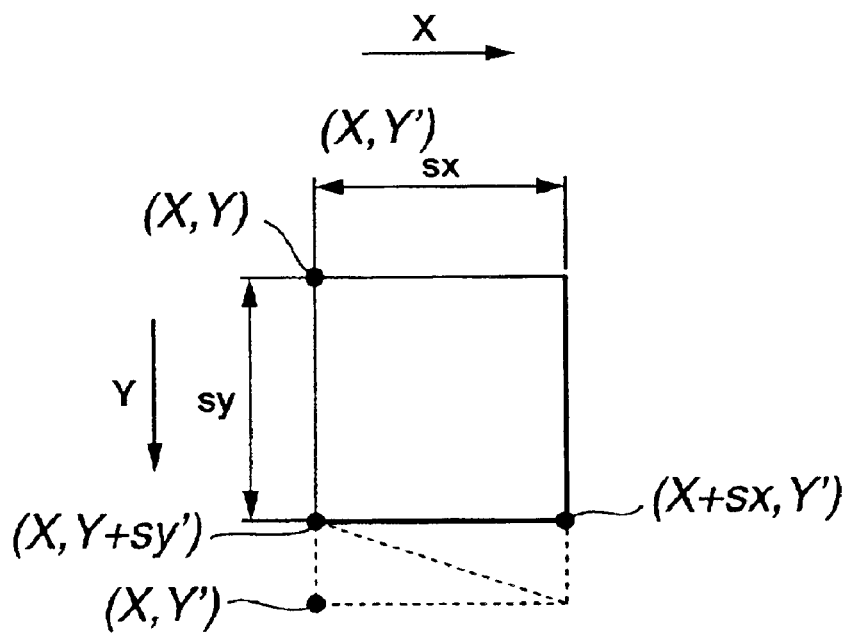
Figure 20A:
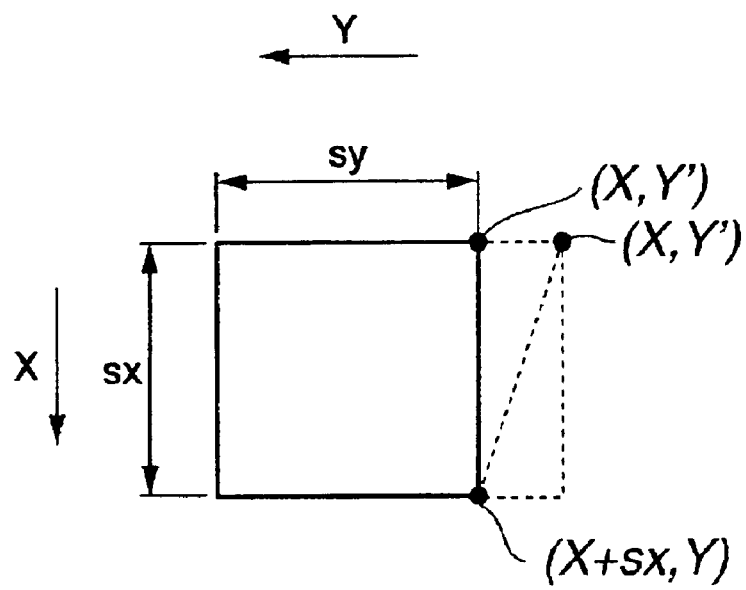
FIGS. 20A and 20B illustrate a drawing area for one character and a drawing position of a decorative object in case of a vertically arrayed text.
Figure 20B:
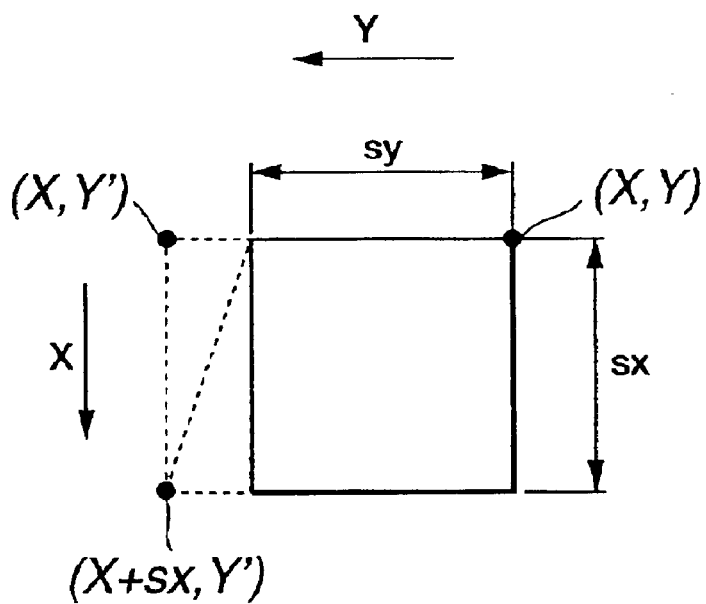

Meanwhile, FIGS. 19A and 19B show a one character drawing area for a horizontally arranged text, whilst FIGS. 20A and 20B show a one-character drawing area for a vertically arranged text. Moreover, FIG. 19A shows a case of drawing a decorative object upstream of a one-character drawing area of a horizontally arranged text, FIG. 19B shows a case of drawing a decorative object downstream of a one-character drawing area of a horizontally arranged text, FIG. 20A shows a case of drawing a decorative object upstream of a one-character drawing area of a vertically arranged text, FIG. 20B shows a case of drawing a decorative object downstream of a one-character drawing area of a vertically arranged text. In each one-character drawing area, shown in FIGS. 19A, 19B, 20A and 20B, the directions indicated by arrows X and Y denote the line direction and the line feed direction, respectively, whilst the sizes sx and sy denote the character sizes in the line direction and in the line feed direction, respectively.

When the drawing apparatus at step S61 has acquired the information pertinent to the character drawing start positions and character sizes, it verifies at the next step S62 whether or not decoration is to be annexed to the displayed characters. If the drawing apparatus at step S61 has verified that decoration is to be annexed, it proceeds to step S63 and, if otherwise, it proceeds to step S68.

At step S63, the drawing apparatus verifies whether the decorating position is upstream or downstream of the character in question. If the drawing apparatus has verified at step S63 that the decorating position is in the upstream direction, it proceeds to step S64 and so forth. If the drawing apparatus has verified at step S63 that the decorating position is in the downstream direction, it proceeds to step S65 and so forth.

If it is found at step S63 that the decorating position is in the upstream direction and hence the drawing apparatus proceeds to step S64, it finds a drawing start position Y' of a decorative object lying upstream of the coordinate position Y in the line feed direction, as shown in FIG. 19A or 20A.

The drawing apparatus then finds, as processing at step S66, a quadrangle having respective coordinate positions (X, Y') and (X+sx, Y) as a diagonal line ((X' Y')–(X+sx, Y)), and draws a decorative object in the quadrangle. The drawing apparatus then proceeds to processing at step S68. For example, emphasis points as decorative objects are drawn or demonstrated on the display upstream of the character, as shown in FIGS. 8A to 8C.

If it is found at step S63 that the decorating position is in the downstream direction, and hence the drawing apparatus proceeds to step S65, the drawing apparatus finds the drawing start position Y' of the decorative object lying downstream of the coordinate position Y in the line feed direction, as shown in FIG. 19B or 20B.

The drawing apparatus then finds a quadrangle having respective coordinate positions (X, Y+sy) and (X+sx, Y') as a diagonal line ((X, Y+sy)–(X+sx, Y')), and draws a decorative object in the quadrangle. The drawing apparatus then proceeds to processing at step S68.

At step S68, the drawing apparatus draws a character in the one-character drawing area represented by a coordinate (X, Y).

The drawing apparatus then sets the next character drawing start position, as processing at step S69, to terminate the processing.

Figure 21:
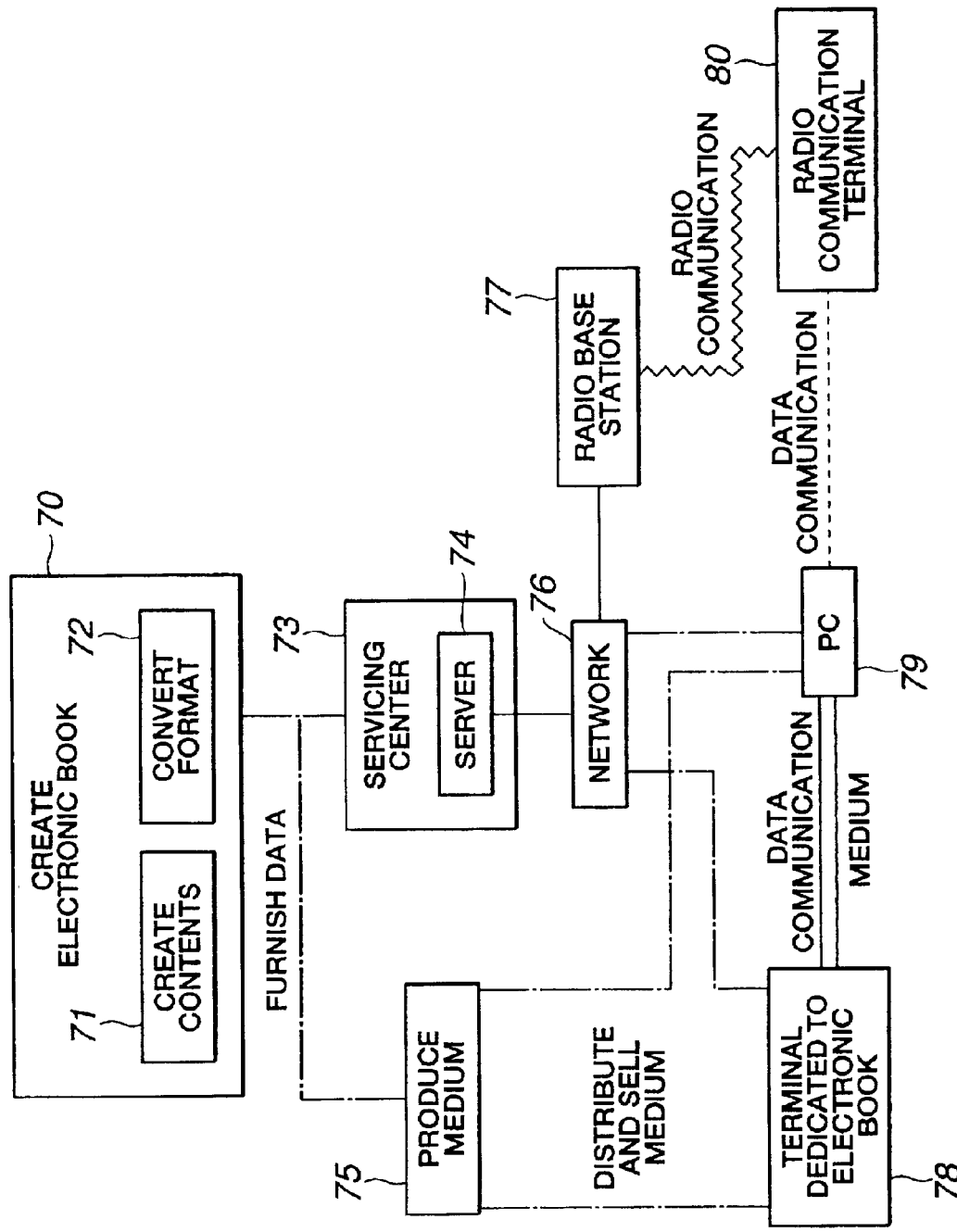
FIG. 21 shows a system configuration in case of distributing an electronic book using a structured document employed in the present invention.
Figure 22:
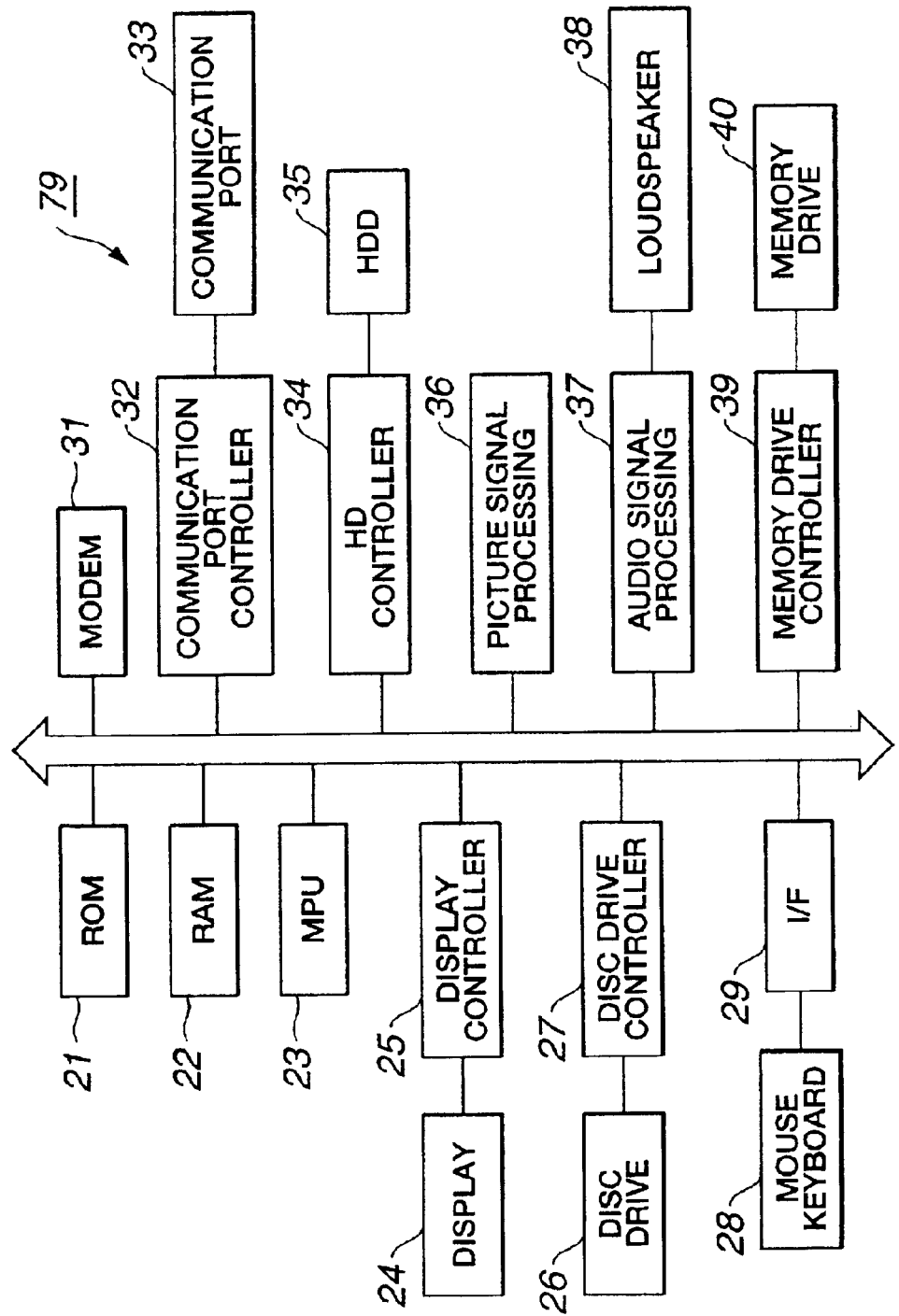
FIG. 22 shows a schematic illustrative structure of a personal computer as a typical drawing apparatus embodying the present invention.

Referring to FIGS. 21 and 22, a specified illustrative structure of a drawing apparatus of the present embodiment is now explained.

The structured document in the present embodiment is suited to e.g., an electronic book. FIG. 21 shows a system configuration in case of distributing an electronic book using a structured document of the present embodiment. FIG. 21 shows, as a drawing apparatus for drawing a structured document distributed as the electronic book, a personal computer 79 or a terminal dedicated to electronic books 78, including a display device, and a radio communication terminal 80, such as a portable telephone set, similarly including a display device.

In the system configuration, shown in FIG. 21, an electronic book forming unit 70 may, for example, be a publishing or information furnishing company for preparing electronic books with a structured document of the present embodiment. Here, contents prepared or collected by the contents creating unit 71 are converted by a format converter 72 into a structured document of the present embodiment.

The electronic book data, created by the present electronic book forming unit 70, are furnished to a medium producing unit 75 for producing an electronic book medium, comprised of a packaged disc, such as CD-ROM or a DVD-ROM (digital versatile disc-ROM), a packaged semiconductor memory, or to a servicing center 73 distributing electronic book data, through a communication route, and thence to a server 74.

The electronic book medium, produced by the medium producing unit 75, is distributed or sold to the terminal dedicated to electronic books 78 or to a user of the personal computer 79. The electronic book data, stored in the server 74 of the servicing center 73, is distributed, responsive to requests made from the communication network, such as Internet, common network 78 or telephone network, that is from the user, or transmitted to a radio communication terminal 80 over a radio base station 77. Moreover, electronic book data can be transmitted/received by e.g., data communication or mediums between the terminal dedicated to electronic books 78, personal computer 79 and the radio communication terminal 80.

With the above-described structure of the system of FIG. 21, the electronic book data, distributed or received, can be demonstrated in the terminal dedicated to electronic books 78, personal computer 79 and the radio communication terminal 80 adapted for coping with the present embodiment of the drawing apparatus. Since the electronic book data is rendered a structured document of the above-described embodiment, the terminal dedicated to electronic books 78, personal computer 79 and the radio communication terminal 80 is able to display the data in the horizontally or vertically arranged form responsive to a request from the user or from a data distributor.

FIG. 22 schematically shows an illustrative structure of the personal computer 79 as an embodiment of the drawing apparatus of the present invention.

Referring to FIG. 22, an application program for the structured document of the present embodiment is installed on the personal computer. Based on the application program, stored in a RAM 22, a MPU (micro-processor unit) 23 demonstrates the structured document of the present embodiment based on the flowchart shown in FIGS. 12 and 16 to 18. A ROM 21 stores initial setting values etc., of the personal computer.

In the hard disc of the hard disc drive 35, an application program is stored. The application program, recorded on the hard disc, is stored through a hard disc controller 34 on the RAM 22.

The electronic book data may be acquired by a disc drive controller 27 reproducing a disc, such as CD-ROM or a DVD-ROM, loaded on the disc drive 26, or by a memory drive controller 39 reproducing the packaged semiconductor memory loaded in a memory drive 40. Alternatively, the electronic book data may be downloaded over the modem 31 from the server 74 furnished from outside over a communication port 33 or a communication port controller 32 so as to be stored e.g., in a hard disc or read out as necessary.

An image signal processing unit 36 operates under control by a display controller 25 to process image signals for demonstrating an image or a document, such as electronic book, on a display 24.

An audio signal processor 37 processes audio signals to route the processed signal to a loudspeaker 38.

An operating signal from a mouse or a keyboard 28, as accessory devices to a routine personal computer, is captured over an interfacing (I/F) unit 29. If, as a result of operation on the mouse or the keyboard 28, a command is issued for displaying the document on the display 24 by vertical or horizontal representation, the MPU 23 is responsive to the command to demonstrate the structured document in the horizontally or vertically arranged document on the display 24.

Figure 23:
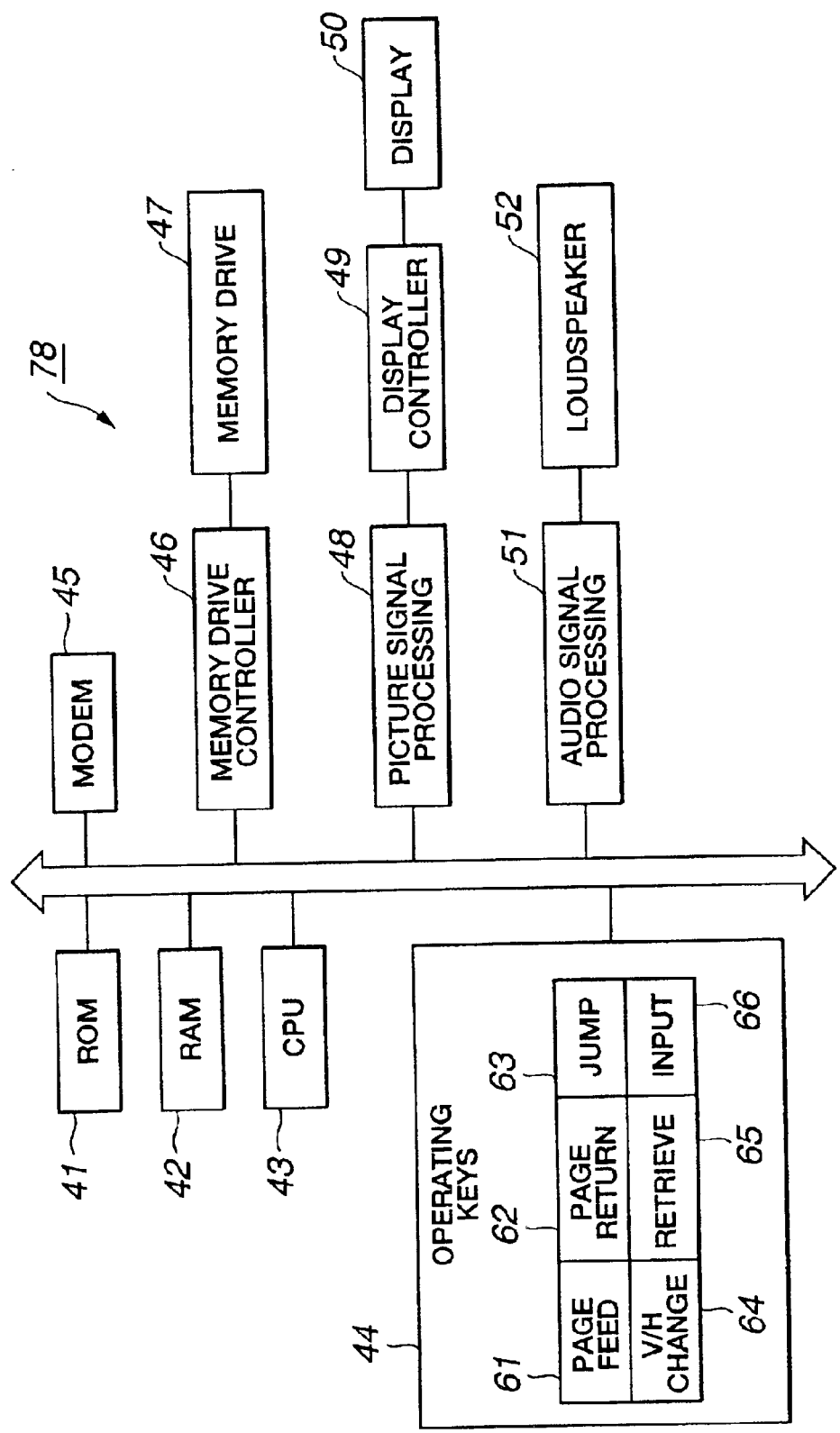
FIG. 23 shows a schematic illustrative structure of a terminal dedicated to electronic books embodying the present invention.

FIG. 23 schematically shows an illustrative structure of the terminal dedicated to electronic books 78 as a typical of the present embodiment of the drawing apparatus.

In FIG. 23, the terminal dedicated to electronic books 78 has installed thereon a program associated with the structured document of the present embodiment. The CPU 43 demonstrates a structured document of the present embodiment based on the flowchart shown in FIGS. 12 and 16 to 19 by a program stored in a RAM 42. A ROM 41 serves for storing initial setting values of the terminal dedicated to electronic books 78. The terminal dedicated to electronic books 78 may include a hard disc in which to store the program.

The electronic book data may be obtained by the drive controller 46 reproducing a packaged semiconductor memory, loaded in a memory drive 47, or may be furnished from outside on downloading through modem 45 from the server 74, so as to be supplied to a picture signal processor 48. If the terminal dedicated to electronic books 78 is provided with a disc drive, such as CD-ROM or DVD-ROM, or a communication port, the electronic book data may be captured by reproducing a recording medium such as CD-ROM or DVD-R or over a communication network, such as Internet.

A picture signal processor 46 performs picture signal processing in demonstrating an image or a document of an electronic book on display 50 through a display controller 49.

An audio signal processor 51 processes audio signals and furnishes the signal so processed to the loudspeaker 52.

The terminal dedicated to electronic books 78 includes, as an actuating key unit 44, a page feed key 61, a page return key 62, a page jump key 63, a vertical/horizontal display conversion key 64, a retrieval key 65, an input key 66 and so forth. If the page feed key 61, page return key 62 or the page jump key 63 is actuated by a user of the terminal 78, the CPU 43 is responsive to the operation to effect page feed, page return or page jump of the electronic book responsive to the user actuation. If the vertical/horizontal display conversion key 64 is actuated by a user of the terminal 78, the CPU 43 is responsive to the operation to change the display of an electronic book to vertically arranged representation or to horizontally arranged representation of the electronic book. If the retrieval key 65, for example, is actuated by the user, the CPU 43 retrieves desired retrieval items in an electronic book, responsive to the actuation of the key 65, to capture the input information of the key 65, if it is the input key 66 that has been so actuated.

If an electronic book is to be received or displayed in the radio communication terminal 80, the terminal is configured substantially similarly to the terminal dedicated to electronic books 78 shown in FIG. 23. It is noted that a ten-key, for example, may be substituted for the operating key.

In the above-described embodiment, electronic book data as structured document is distributed by a recording medium, such as CD-ROM or DVD-R, and an application program for displaying the structured document based on a flowchart shown in FIGS. 16 to 18 in the terminal 78 is stored in hard disc or in a RAM. In this case, both the electronic book data as the structured document and the aforementioned application program may be stored in one and the same recording medium.

According to the present invention, as described above, a layout describing command for specifying the aforementioned relative position designation is used to enable not only the horizontally written text but also the vertically arranged text, indispensable in Japanese text representation, thereby assuring more flexible text representation and elevated legibility of a stylistic document.

Heretofore, it is necessary for an editor, a document creating software (word-processor software) or a terminal to switch to a user interface for vertical writing if a document is to be arranged vertically. According to the present embodiment, it is possible to cope with both vertical and horizontal writing with a sole user interface.

In near future, an electronic document will possibly be distributed in many cases to a user via a recording medium or through a communication network as a structured document and a style document describing th corresponding layout method. The present embodiment is able to cope with this case extremely readily.

Industrial Applicability

According to the present invention, the drawing information including the object information and the layout definition information specifying the relative position direction with respect to the object arranging direction is analyzed and the relative placing position of the object in a drawing area is determined on the basis of the layout definition information associated with the layout designating information. The real display position corresponding to the relative placing position is generated responsive to the object arranging direction to render it possible to change the object layout, such as characters, figures or symbols, handled by a computer, extremely readily.

On the other hand, the information on one or more objects that can be displayed is generated and the drawing information including the object information and the layout definition information specifying the relative position direction with respect to the object arranging direction is also generated to furnish the drawing information with which it is possible to change the object layout, such as characters, figures or symbols, handled by a computer, extremely readily.

What is claimed is:

1. An information processing method for automatically processing a display of a plurality of objects within an electronic structured document and for enabling a command text to be used by a user to switch between a vertically-arrayed text and a horizontally-arrayed text, the method comprising the automated steps of:

analyzing drawing information including information relating to the plurality of objects to be displayed and layout designating information for specifying a relative position direction with respect to a direction of arranging the plurality of objects within the electronic structured document, wherein the layout designating information is included in the electronic structured document;

determining a relative placing position of the plurality of objects in a desired drawing area based on layout definition information corresponding to the layout designating information included in the electronic structured document and obtained by the analysis of the drawing information;

generating actual object display position information for the plurality of objects corresponding to the relative placing position of the plurality of objects responsive to the arranging direction; and displaying the object within the desired drawing area based on the generated actual object display position information, wherein the relative position direction is one of vertical and horizontal.

2. The information processing method according to claim 1, wherein the layout definition information includes information indicating a size of the drawing area; and the drawing area and the relative placing position of the plurality of objects in the drawing area are converted into a plurality of object display positions.

3. The information processing method according to claim 2, wherein the plurality of objects are displayed based on the plurality of object display positions.

4. The information processing method according to claim 1, wherein the relative placing position of the plurality of objects is updated in response to the command text.

5. The information processing method according to claim 1, wherein the plurality of objects comprises a first object and a second object;

a relative placing position of the first object is determined based on a layout definition information of the first object; and a relative placing position of the second object is determined responsive to the determined relative placing position of the first object.

6. An information processing apparatus for automatically processing a display of a plurality of objects within an electronic structured document and for enabling a command text to be used by a user to switch between a vertically-arrayed text and a horizontally-arrayed text, the automated apparatus comprising:

means for analyzing drawing information including information relating to the plurality of objects to be displayed and layout designating information for specifying a relative position direction with respect to a direction of arranging the plurality of objects within the electronic structured document, wherein the layout designating information is included in the electronic structured document;

means for determining a relative placing position of the plurality of objects in a desired drawing area based on layout definition information corresponding to the layout designating information included in the electronic structured document and obtained by the analysis of the drawing information;

means for generating actual object display position information for the plurality of objects corresponding to the relative placing position of the plurality of objects in response to the arranging direction; and display means for displaying the object within the desired drawing area based on the generated actual object display position information, wherein the relative position direction is one of vertical and horizontal.

7. The information processing apparatus according to claim 6, wherein the layout definition information includes the information indicating a size of the drawing area; and the generating means converts the drawing area and the relative placing position of the plurality of objects in the drawing area into a plurality of object display positions.

8. The information processing apparatus according to claim 7, further comprising:

means for displaying the plurality of objects based on the plurality of object display positions.

9. The information processing apparatus according to claim 6, wherein the relative placing position determining means updates the relative placing position of the plurality of objects in response to the command text.

10. The information processing apparatus according to claim 6, further comprising means for inputting the command text by the user.

11. The information processing apparatus according to claim 6, wherein the plurality of objects comprises a first object and a second object;

the placing position decision means determines a relative placing position of the first object based on layout definition information of the first object; and the placing position decision means determines a relative placing position of the second object responsive to the determined relative placing position of the first object.

12. A medium for causing an information processing apparatus to execute a program for automatically processing a display of a plurality of objects within an electronic structured document and for enabling a command text to be used by a user to switch between a vertically-arrayed and a horizontally-arrayed text, the program including the automated steps of:

analyzing drawing information including information relating to the plurality of objects to be displayed and layout designating information for specifying a relative position direction with respect to a direction of arranging the plurality of objects within the electronic structured document, wherein the layout designating information is included in the electronic structured document;

determining a relative placing position of the plurality of objects in a desired drawing area based on layout definition information corresponding to the layout designating information included in the electronic structured document and obtained by the analysis of the drawing information;

generating actual object display position information for the plurality of objects corresponding to the relative placing position of the plurality of objects responsive to the arranging direction; and displaying the object within the desired drawing area based on the generated actual object display position information, wherein the relative position direction is one of vertical and horizontal.

* * * * *